United States Patent Office 3,446,832
Patented May 27, 1969

1

3,446,832
ALKALI METAL SALTS OF N-ALKOXY SUBSTI-
TUTED PHENOXY ALKYLENE AMIDES
Jordan P. Berliner and Sidney B. Richter, Chicago, Ill.,
assignors to Velsicol Chemical Corporation, Chicago,
Ill., a corporation of Illinois
No Drawing. Continuation-in-part of application Ser. No.
388,915, Aug. 11, 1964. This application Nov. 7, 1966,
Ser. No. 592,276
Int. Cl. C07c 119/20; A01n 9/24
U.S. Cl. 260—453            7 Claims

ABSTRACT OF THE DISCLOSURE

Alkali metal salts of N-alkoxy substituted phenoxy alkylene amides useful as herbicides and as intermediates in the production of other compounds, particularly herbicides.

This application is a continuation-in-part of our copending application Ser. No. 388,915 filed Aug. 11, 1964, now U.S. Patent 3,371,106.

This invention relates to new chemical compositions of matter. More particularly, this invention relates to novel alkali metal salts of N-alkoxy substituted phenoxy alkylene amides useful as herbicides and as intermediates in the production of other compounds, particularly herbicides.

Recently it was discovered that N-alkoxy amides of several phenoxy alkylene acids are valuable herbicides. However, these amides have very little solubility in water and the usual liquid agricultural solvents. Thus, liquid concentrates or formulations of these amides are generally not feasible.

Liquid formulations of herbicides are desirable since they facilitate application to the locus of undesirable plant life by spraying, fogging and the like. Herbicides which are soluble in water are particularly desirable since the herbicide can be applied by dissolving in water and spraying the aqueous solution. Therefore, there is an existing need for herbicides which are soluble in the common organic solvents and especially for herbicides which are water soluble.

Thus, it is one object of the present invention to provide new herbicidal compounds.

It is another object of the present invention to provide herbicidal compounds which are water soluble.

Still another object of this invention is to provide intermediates for chemical compounds, particularly new herbicidal compounds.

These and other objects and advantages of the present invention will be readily apparent from the ensuing description.

The present invention comprises new chemical compounds of the formula

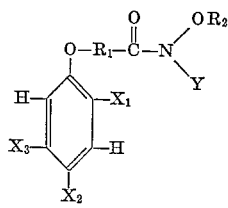

wherein $X_1$ is selected from the group consisting of hydogen, chlorine, a lower alkyl group and a lower alkenyl group; $X_2$ is selected from the group consisting of hydrogen, halogen, a lower alkyl group and a lower alkenyl group; $X_3$ is selected from the group consisting of hydrogen and chlorine, provided that a maximum of one of $X_1$ and $X_2$ is hydrogen, $X_2$ is chlorine when $X_1$ is chlorine and when $X_3$ is chlorine $X_1$ and $X_2$ are both chlorine; $R_1$ is an unsubstituted alkylene group; $R_2$ is a lower alkyl group; and Y is an alkali metal.

Preferably the new compounds of the present invention have the above structural formula wherein $X_1$ is selected from the group consisting of chlorine and an unsubstituted lower alkyl group; $X_2$ is chlorine; $X_3$ is hydrogen; $R_1$ is a methylene group; $R_2$ is an unsubstituted lower alkyl group; and Y is an alkali metal selected from the group consisting of sodium, potassium and lithium.

Exemplary of the novel compounds of this invention are:

the potassium salt of N-methoxy-2-methyl-4-
  chlorophenoxyacetamide,
the sodium salt of N-methoxy-2-methyl-4-
  chlorophenoxyacetamide,
the potassium salt of N-ethoxy-2-methyl-4-
  chlorophenoxyacetamide,
the sodium salt of N-ethoxy-2-methyl-4-
  chlorophenoxyacetamide,
the potassium salt of N-methoxy-2,4-
  dichlorophenoxyacetamide,
the potassium salt of N-methoxy-4-
  dichlorophenoxyacetamide,
the sodium salt of N-ethoxy-2,4-
  dichlorophenoxyacetamide,
the potassium salt of N-methoxy-2,4,-dimethyl-
  phenoxyacetamide,
the sodium salt of N-methoxy-2,4,5-
  trichlorophenoxyacetamide,
the potassium salt of N-methoxy-4-
  bromophenoxyacetamide,
the sodium salt of N-ethoxy-2,4,5-
  trichlorophenoxyacetamide,
the potassium salt of N-methoxy-2-
  methylphenoxyacetamide,
the sodium salt of N-methoxy-4-
  methylphenoxyacetamide,
the potassium salt of N-isopropoxy-2-
  methylphenoxyacetamide,
the lithium salt of N-methoxy-2-methyl-4-
  chlorophenoxypropionamide, and the like.

The new compounds of the present invention are useful as herbicides, a usefulness which is enhanced by their water solubility. The compounds can be also be used as intermediates to make other compounds, particularly other herbicides as will be hereinafter described.

These new compounds can be prepared readily from the corresponding N-alkoxy amides by treating the latter with an approximately equimolar amount of an alkali metal base, preferably an alkali metal hydroxide, such as potassium hydroxide or sodium hydroxide, dissolved in an alcoholic solvent such as methanol, ethanol, isopropanol, and the like. The amides can be dissolved in the alcohol or in other solvents, such as dioxane. The reaction can be effected by heating the reaction mixture for several hours preferably at reflux temperature. The desired salts can be separated from the reaction mixture by means common to the art, such as evaporation, extraction, drying and the like.

The preparation of many of the N-alkoxy amides described above are known to the art. For example, United States Patents 3,027,407, 3,166,589, 3,166,591, and 3,168,561 and our copending application Ser. No. 515,167, described the preparation of these amides. These amides can be prepared readily by the reaction of the appropriately substituted phenoxy alkanoyl halide with an appropriate N-alkoxy amine. The acyl halide suitable as starting materials are either known in the art or can be prepared readily from the corresponding carboxylic acids by reaction with halogenating agents such as thionyl chloride or phosphorus pentachloride.

The manner in which the compounds of the present invention can be prepared is illustrated in the following example:

EXAMPLE 1

Preparation of the potassium salt of N-methoxy-4-chloro-2-methylphenoxyacetamide A solution of N-methoxy-4-chloro-2-methylphenoxyacetamide (15.2 g.; 0.66 mole) in dioxane (50 ml.) and 90% potassium hydroxide (4.1 g.; 0.66 mole) in absolute ethanol (30 ml.) was placed in a 250 ml. three-necked, round bottom flask, fitted with a stirrer and condenser, topped by a calcium chloride tube. The reaction mixture was stirred and heated at reflux temperature for 6½ hours. The mixture was then evaporated in a rotary evaporator to yield a yellow-brown amorphous solid. This solid was taken up in diethyl ether. The ether solution was dried over magnesium sulfate, filtered and evaporated on a steam bath to yield a solid which was air dried, and again treated with diethyl ether. The solid did not dissolve and the suspension was filtered. The white solid obtained was dried and identified as the potassium salt of N-methoxy-4-chloro-2-methylphenoxyacetamide by infrared analysis. A sample of the product held in a flame gave a purple flame as it burned and left a residue indicating the presence of the potassium salt. The product has the following elemental analysis as calculated for $C_{10}H_{11}ClNO_3K$.—Theoretical: N, 5.23%. Found: N, 5.01%.

EXAMPLE 2

Preparation of the potassium salt of N-methoxy-2,4,5-trichlorophenoxyacetamide

A solution of N-methoxy-2,4,5-trichlorophenoxyacetamide (121.8 g.; 0.428 mole) in isopropyl alcohol (610 ml.) was stirred in a 2 liter three-necked round bottom flask fitted with a stirrer and reflux condenser. A solution of 90% potassium hydroxide (26.7 g.; 0.428 mole) in isopropyl alcohol (270 ml.) was added to the flask. The reaction mixture was heated and stirred at reflux temperature for about 7 hours. The mixture was then evaporated in a rotary evaporator and the remaining diluted with a minimum amount of hot water to form a solution. The hot solution was filtered through filter aid and the filtrate was diluted to a final volume of 508 ml. with water to give a solution of the potassium salt of N-methoxy-2,4,5-trichlorophenoxyacetamide equivalent to 2 pounds actual chemical based on the amide per gallon of solution.

EXAMPLE 3

Preparation of the potassium salt of N-ethoxy-4-chloro-2-methylphenoxyacetamide

A solution of N-ethoxy-4-chloro-2-methylphenoxyacetamide (5.7 g.; 0.023 mole) in isopropyl alcohol (29 ml.) was placed in a 100 ml. three-necked flask fitted with a stirrer and a reflux condenser. A suspension of potassium hydroxide (1.4 g.; 0.023 mole) in isopropyl alcohol (20 ml.) was added to the flask. The reaction mixture was heated and stirred at reflux temperature for about 7 hours. The reaction mixture was then evaporated in a rotary evaporator to yield a yellow-brown viscous oil. This oil was the desired potassium salt of N-ethoxy-4-chloro-2-methylphenoxyacetamide as identified by converting a small amount of the oil back to the amide and identifying the amide by infra-red analysis.

EXAMPLE 4

Preparation of the potassium salt of N-ethoxy-2,4-dichlorophenoxyacetamide

A solution of N-ethoxy-2,4-dichlorophenoxyacetamide (75.3 g.; 0.285 mole) in isopropyl alcohol (380 ml.) was placed in a 1 liter, three-necked flask fitted with a stirrer and reflux condenser. Ninety percent potassium hydroxide (17.8 g.; 0.285 mole) and isopropyl alcohol (80 ml.) was added to the flask. The reaction mixture was heated and stirred at reflux temperature for about 7 hours. The mixture was then evaporated in a rotary evaporator to yield a yellow semi-solid which was the potassium salt of N-ethoxy-2,4-dichlorophenoxyacetamide.

EXAMPLE 5

Preparation of the potassium salt of N-ethoxy-2,4,5-trichlorophenoxyacetamide

A solution of N-ethoxy-2,4,5-trichlorophenoxyacetamide (85.2 g.; 0.294 mole) in isopropyl alcohol (425 ml.) was placed in a one liter, three-necked flask fitted with a stirrer and a reflux condenser. Ninety percent potassium hydroxide (18.3 g.; 0.294 mole) and isopropyl alcohol (180 ml.) was added to the flask. The reaction mixture was heated and stirred at reflux temperature for about 7 hours. The mixture was evaporated in a rotary evaporator to yield a dark brown semi-solid which was the desired potassium salt of N-ethoxy-2,4,5-trichlorophenoxyacetamide.

Other compounds of the present invention can be prepared by the procedure detailed in the foregoing examples. Presented in the following experiments are the required reactants to form the indicated named compounds by the procedures of Examples 1–5.

EXAMPLE 6

N-methoxy - 2,4 - dichlorophenoxyacetamide+potassium hydroxide=the potassium salt of N - methoxy-2,4-dichlorophenoxyacetamide.

EXAMPLE 7

N - methoxy - 4 - chlorophenoxyacetamide+sodium hydroxide=the sodium salt of N-methoxy-4-chlorophenoxyacetamide.

EXAMPLE 8

N - methoxy - 2,4 - dimethylphenoxyacetamide+potassium hydroxide=the potassium salt of N - methoxy-2,4-dimethylphenoxyacetamide.

EXAMPLE 9

N - methoxy - 2,4,5 - trichlorophenoxyacetamide+sodium hydroxide=the sodium salt of N - methoxy - 2,4,5-trichlorophenoxyacetamide.

EXAMPLE 10

N - methoxy - 4 - bromophenoxyacetamide+potassium hydroxide=the potassium salt of N-methoxy-4-bromophenoxyacetamide.

EXAMPLE 11

N - methoxy - 2 - methylphenoxyacetamide+sodium hydroxide=the sodium salt of N-methoxy - 2 - methylphenoxyacetamide.

EXAMPLE 12

N - methoxy - 4 - methylphenoxyacetamide+potassium hydroxide=the potassium salt of N-methoxy-4-methylphenoxyacetamide.

EXAMPLE 13

N-methoxy - 2,4 - dimethylphenoxyacetamide+sodium hydroxide=the sodium salt of N-methoxy-2,4-dimethylphenoxyacetamide.

EXAMPLE 14

N-isopropoxy-2-methylphenoxyacetamide+sodium hydroxide=the sodium salt of N-isopropoxy-2-methylphenoxyacetamide.

For practical use as a herbicide, the compounds of the present invention can be dissolved in water and the aqueous solution applied conveniently to the site of the weed infestation. Thus, one method for the control of undesirable plant life comprises applying to the locus of the said plant life a herbicidal composition comprising water as in inert carrier and as the essential active ingredient in a quantity which is herbicidally injurious to said plant life, a compound of the present invention dissolved therein. The concentration of the new compounds of this invention in the compositions will vary greatly with the type of application equipment employed and the purpose for which the composition is to be used, but generally the herbicidal compositions will comprise from about 0.05 to about 95% by weight of the active compounds of this invention. In a preferred embodiment of this invention, the herbicidal compositions will comprise from about 5 to about 75% by weight of the active compounds. The compositions can also comprise such additional substances as other pesticides, such as insecticides, nematocides, fungicides and the like; stabilizers; spreaders; deactivators; adhesives; stickers; fertilizers; activators; synergists; and the like.

It has been found desirable to retain the compounds of the present invention in a relatively moisture-free state until used to preserve the herbicidal activity of the compounds. Thus, it is highly desirable to mix the compounds of the present invention with water immediately prior to application as a herbicide. Moreover, one of the advantages of the present invention is that the compounds can be handled and shipped in the dry state without the presence of other ingredients such as carriers, emulsifiers, wetting agents, and the like and then diluted with water at the time and situs of the herbicide application.

Weeds are undesirable plants in their growing where they are not wanted, having no economic value, and interfering with the production of cultivated crops or with the welfare of livestock. Many types of weeds are known, including annuals such as pigweed, lambsquarters, foxtail, crabgrass, wild mustard, field pennycress, rye-grass, goose-grass, wild oats, velvet leaf, chickweed, purselane, barnyard grass, knotweed, cocklebur, wild buckwheat, kochia, medic, and smartweed; biennials such as wild carrot, great burdock, mullein, round-leaved mallow, blue thistle, bull thistle, hounds-tongue, moth mullein, matricaria, and purple star thistle; or perennials such as white cockle, dandelion, campanula, perennial rye-grass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

Some typical herbicidal compositions which can be used in the method of this invention are shown in the following examples, in which all quantities given are in parts by weight.

EXAMPLE 15

Preparation of a wettable powder

The product of Example 1 is a wettable powder. This powder is mixed with water immediately before application to give an aqueous solution containing the desired concentration of active compounds for use as a spray.

EXAMPLE 16

Preparation of a wettable powder

The following components are mixed intimately in conventional mixing or blending equipment and are then ground to a powder having an average particle size of less than about 50 microns. The finished powder is dispersed in water to give the desired concentration of active compound.

| | |
|---|---|
| Product of Example 3 | 75 |
| Fuller's earth | 22.75 |
| Sodium lauryl sulfate | 2 |
| Methyl cellulose | .25 |

The herbicidal activity of the compounds of this invention was demonstrated by experiments carried out for the pre-emergence control of various grassy and broadleaf weeds. In these experiments, field plots were seeded with various crop plants and treated with the product of Example 1, which was formulated as an aqueous solution prepared by dissolving the product in water, onto the surface of the soil at the time of planting. As indicated in the table below, the plots were observed from 24 days to 2 months after the treatment, at which time the identity of the weeds in the area and the degree of injury to the weeds were rated on a scale of from 0 to 10 as follows: 0=no injury, 1, 2=slight injury, 3, 4=moderate injury, 5, 6=moderately severe injury, 7, 8, 9=severe injury and 10=death. Presented in Table I below are some of the results of these experiments.

TABLE I

| Days [1] | Dosage [2] concn. | Injury rating | | Weed species in test [3] |
|---|---|---|---|---|
| | | Grasses | Broadleaf | |
| 28 | 2 | 8-9 | 8-9 | FT, CG, PL, RW |
| 43 | 2 | 8-9 | 8-9 | FT, PW, BP, CW |
| 39, 29 [4] | 1.5 | 8-9 | 8-9 | FT, PW, BP, CW, M |
| 50 | 2 | 10 | 10 | FT, PW, CW, PL, CG, GG |
| 24-30 | 1 | 9 | 7-8 | PW, PL, MG, CB, S |
| 29 | 1 | 10 | 9 | PW, CG |
| 46 | 1 | 10 | 10 | PW, CG |
| 27 | 1 | 7 | 7 | PW, CG |
| 56 | 1 | 9 | 9 | PW, CG, CW |
| 20 | 1 | 10 | 10 | PW, CG, CW |
| 61 | 1 | 9 | 7 | PW, CG, CW |
| 33 | 1 | 7 | 8 | PW, CG |

[1] From application at planting to observation.
[2] Pounds actual chemical per acre based on corresponding amide.
[3] FT=foxtail, CG=crabgrass, PL=purselane, RW=ragweed, PW=pigweed, BP=blue panicum, CW=carpetweed, M=mustard, GG=goosegrass, MG=morning-glory, CB=cocklebur, S=sesbania.
[4] Thiry-nine days from planting to application, 29 days from application to observation.

The herbicidal activity of the compounds of this invention was also demonstrated by experiments carried out for the post-emergence control of weeds. In these experiments plots in the field were planted with various crops and after emergence of these crops, i.e., 1 or 3 weeks after planting, the plots were sprayed with the product of Example 1, which was formulated as an aqueous solution prepared by dissolving the product in water at the indicated concentration, on the surface of the soil. After the period of time indicated below, the plots were observed, the species of weeds in the area noted and the degree of injury to the weeds were rated on a scale of from 0 to 10 as heretofore described. Presented in Table II below are the time periods, dosage, injury ratings and weed species in these experiments:

TABLE II

| Days[1] | Days[2] | Dosage concn.[3] | Injury rating Grasses | Broadleaf | Weed species in test[4] |
|---|---|---|---|---|---|
| 21 | 28 | 1–2 | 8–10 | 8–10 | FT, PW, BG, LQ |
| 7 | 43 | 1–2 | 8–9 | 5–7 | FT, PW, PL, CG, CW, GG |
| 21 | 18 | 0.5 | 7–8 | 7–8 | |
| 21 | 18 | 1 | 8–9 | 8–9 | PW, LQ, SW, DF, M |
| 21 | 18 | 2 | 9–10 | 9–10 | |

[1] From planting to application.
[2] From application to observation.
[3] Pounds actual chemical per acre based on amide.
[4] FT=foxtail, PW=pigweed, BG=barnyard grass, LQ=lambsquarter, PL=purselane, CG=crabgrass, CW=carpetweed, GG=goosegrass, SW=smartweed, DF=dog fennel, M=mustard.

The herbicidal activity of the compounds of this invention was further demonstrated by experiments carried out for the control of weeds in pre-planting tests. In these tests, plots in the field were plowed and then sprayed with the product of Example 1 formulated as an aqueous solution containing 2 pounds of actual chemical per acre based on the amide at a rate of 20 gallons of solution per acre. After the spraying, the formulation was incorporated into the soil to a depth of from 1 to 2 inches by drawing a spike-tooth harrow over the plot. The plots were planted with seeds of various crops on the day after the application. The plots were observed 35 days after the planting and untreated adjacent plots were found to contain large quantities of smartweed, wild buckwheat, knotweed, and lady's thumb and lesser amounts of lambsquarters, pigweed, spurry, chickweed, groundsel, and wild mustard. The injury to the weeds was observed and rated on the scale of 0 to 10 indicated above. The results of this test are summarized in Table III below:

TABLE III

Injury rating:
  Grasses _____ 7–8
  Broadleaf _____ 7–8

The compounds of the present invention are also useful as intermediates in the production of other compounds, particularly other herbicides. For example, compounds of the above described formula, wherein Y is acyl, such as acetyl can be prepared from the compounds of the present invention.

These N-alkoxy-N-acyl compounds can be prepared readily by treating the corresponding compound of the present invention with about an equimolar amount of a suitable acyl halide in the presence of a solvent such as dioxan which is present in a concentration of about 8 parts by weight to 1 part of the salt. The reaction mixture is heated for several hours preferably at about reflux temperature and then added to water. After this dilution, the final product is recovered by means common to the art such as filtration, evaporation and the like. The manner in which the compounds of the present invention can be utilized as intermediates in the production of other compounds is illustrated in the following examples:

EXAMPLE 17

Preparation of N-acetyl-N-methoxy-4-chloro-2-methylphenoxyacetamide

The potassium salt of N-methoxy-4-chloro-2-methylphenoxyacetamide (6.2 g.; 0.023 mole) in dioxan (50 ml.) was placed in a 100 ml. three-necked flask fitted with a stirrer, condenser, and addition funnel. Acetyl chloride (1.8 g.; 0.023 mole) was added to the stirred mixture in the flask. The reaction mixture was stirred and heated at reflux temperature for 2½ hours. The mixture was then cooled to room temperature and poured into distilled water (500 ml.). An oil layer formed which soon solidified. The solid was filtered out and washed with water. The solid was dissolved in ether and the aqueous layer was removed. The ether layer was dried over magnesium sulfate, filtered, and evaporated on a steam bath. The residue was a yellow liquid which solidified to a white solid. This product, N-acetyl-N-methoxy - 4 - chloro-2-methylphenoxyacetamide, was recrystallized from absolute ethanol, washed in a little ethanol, and air dried, to give a white solid having a melting point of 94°–104° C. and the following elemental analysis calculated for $C_{12}H_{14}ClNO_4$.—Theoretical: C, 53.04%; H, 5.16%; N, 5.16%. Found: C, 53.10%; H, 5.34%; N, 5.18%.

Other compounds can be prepared from the compounds of the present invention by methods detailed in the preceding example. In the following examples, the compound of the present invention and the acyl halide reactant which can be used to prepare the indicated named compounds are set forth.

EXAMPLE 18

Sodium salt of N-methoxy-2,4-dichlorophenoxyacetamide+acetyl chloride=N-acetyl - N - methoxy-2,4-dichlorophenoxyacetamide.

EXAMPLE 19

Potassium salt of N-methoxy-4-bromophenoxyacetamide+acetyl chloride=N-acetyl - N - methoxy-4-bromophenoxyacetamide.

EXAMPLE 20

Potassium salt of N-methoxy-2,4,5-trichlorophenoxyacetamide+ acetyl chloride=N-acetyl - N - methoxy-2,4,5-trichlorophenoxyacetamide.

EXAMPLE 21

Sodium salt of N-n-propoxy-4-chloro-2-methylphenoxyacetamide+acetyl chloride=N-acetyl - N - n-propoxy-4-chloro-2-methylphenoxyacetamide.

The pre-emergence herbicidal activity of the N-alkoxy-N-acyl compounds heretofore described was illustrated, for example, by a number of experiments carried out for the control of various weeds. In one series of tests, the test compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The severity of injury to each weed was determined about 20 days after the soil treatments. The severity of injury was rated on a 0 to 10 scale as follows: 0=no injury; 1, 2=slight injury; 3, 4=moderate injury; 5, 6=moderately severe injury; 7, 8, 9=severe injury; 10=death. Some of the results of these tests are presented in the following table:

TABLE IV.—INJURY RATINGS
[Concentration of N-acetyl-N-methoxy-4-chloro-2-methylphenoxyacetamide]

| Test plant | 1 lb. per acre | 2 lbs. per acre | 8 lbs. per acre |
|---|---|---|---|
| Crabgrass | 9 | 9 | 10 |
| Foxtail | 9 | 8 | 10 |
| Mustard | 9 | 10 | 10 |
| Pigweed | 10 | 10 | 10 |
| Velvet leaf | 9 | 10 | 10 |
| Downy brome | 6 | 9 | 9 |

Another series of tests which were run, shows the post-emergence herbicidal activity of the N-alkoxy-N-acyl compounds heretofore described. The test compounds were formulated as aqueous emulsions and sprayed at various dosages on the foliage of weeds that had attained a prescribed size. After being sprayed the plants were placed in a greenhouse and watered either daily or more frequently. Water was not applied to the foliage of treated plants. The severity of injury to each weed was determined 13 days after the plants were treated. The degree of injury was rated on the same basis as in the aforementioned series of tests. Some of the results of these tests are presented in the following table:

TABLE V.—INJURY RATINGS

[Concentration of N-acetyl-N-methoxy-4-chloro-2-methylphenoxyacetamide]

| Test plant | 1 lb. per acre | 2 lbs. per acre | 8 lbs. per acre |
|---|---|---|---|
| Barnyard grass | 3 | 8 | 9 |
| Dock | 8 | 7 | 10 |
| Mustard | 9 | 10 | 10 |
| Pigweed | 9 | 10 | 10 |

We claim:

1. A compound of the formula

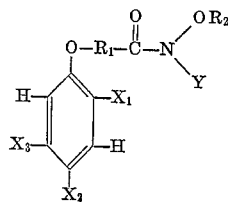

wherein $X_1$ is selected from the group consisting of hydrogen, chlorine and a lower alkyl group; $X_2$ is selected from the group consisting of hydrogen, chlorine, bromine, and a lower alkyl group; $X_3$ is selected from the group consisting of hydrogen and chlorine, provided that a maximum of one of $X_1$ and $X_2$ is hydrogen, $X_2$ is chlorine when $X_1$ is chlorine, and when $X_3$ is chlorine $X_1$ and $X_2$ are both chlorine; $R_1$ is a lower alkylene group; $R_2$ is a lower alkyl group; and Y is an alkali metal selected from the group consisting of sodium, potassium and lithium.

2. A compound of claim 1, wherein $X_1$ is selected from the group consisting of chlorine and lower alkyl; $X_2$ is chlorine; $X_3$ is hydrogen, $R_1$ is a methylene group.

3. The compound of claim 1, the potassium salt of N-methoxy-2-methyl-4-chlorophenoxyacetamide.

4. The compound of claim 1, the potassium salt of N-ethoxy-2-methyl-4-chlorophenoxyacetamide.

5. The compound of claim 1, the potassium salt of N-methoxy-2,4-dichlorophenoxyacetamide.

6. The compound of claim 1, the potassium salt of N-methoxy-2-ethyl-4-chlorophenoxyacetamide.

7. The compound of claim 1, the sodium salt of N-ethoxy-2-methyl-4-chlorophenoxyacetamide.

References Cited

UNITED STATES PATENTS

| 3,166,589 | 1/1965 | Richter | 260—453 |
| 3,166,591 | 1/1965 | Richter | 260—453 |
| 3,168,561 | 2/1965 | Richter | 260—453 |
| 3,187,041 | 6/1965 | Richter | 260—558 |
| 3,187,042 | 6/1965 | Richter. | |
| 3,352,897 | 11/1967 | Richter | 260—453 |

JOSEPH P. BRUST, *Primary Examiner.*

U.S. Cl. X.R.

71—118